(12) United States Patent
Snyder et al.

(10) Patent No.: US 11,412,284 B2
(45) Date of Patent: Aug. 9, 2022

(54) MEDIA CONTENT INGESTION

(71) Applicant: BCE Inc., Verdun (CA)

(72) Inventors: Chris Snyder, Toronto (CA); Josh Gordon, Toronto (CA)

(73) Assignee: BCE Inc., Verdun (CA)

( * ) Notice: Subject to any disclaimer, the term of this patent is extended or adjusted under 35 U.S.C. 154(b) by 86 days.

(21) Appl. No.: 16/372,944

(22) Filed: Apr. 2, 2019

(65) Prior Publication Data

US 2019/0230396 A1 Jul. 25, 2019

Related U.S. Application Data

(63) Continuation of application No. 14/753,545, filed on Jun. 29, 2015, now Pat. No. 10,250,930.

(51) Int. Cl.
| | |
|---|---|
| *H04N 21/2665* | (2011.01) |
| *H04N 21/254* | (2011.01) |
| *H04N 21/4627* | (2011.01) |
| *H04L 65/612* | (2022.01) |
| *H04L 65/60* | (2022.01) |

(52) U.S. Cl.
CPC ..... *H04N 21/2665* (2013.01); *H04L 65/4084* (2013.01); *H04L 65/60* (2013.01); *H04N 21/2541* (2013.01); *H04N 21/4627* (2013.01)

(58) Field of Classification Search
CPC ........... H04N 21/2665; H04N 21/2541; H04N 21/4627; H04N 7/1675; H04L 65/4084; H04L 65/60
See application file for complete search history.

(56) References Cited

U.S. PATENT DOCUMENTS

| | | | | |
|---|---|---|---|---|
| 7,996,672 B1* | 8/2011 | Agrawal | ............... | H04N 7/1675 713/165 |
| 2003/0078891 A1* | 4/2003 | Capitant | .......... | H04N 21/26606 705/57 |
| 2007/0266028 A1* | 11/2007 | Muller | ..................... | G06F 16/40 |
| 2009/0297126 A1* | 12/2009 | Cortes | ............ | H04N 21/234336 386/241 |
| 2012/0017282 A1* | 1/2012 | Kang | .................. | H04N 21/8456 726/26 |
| 2012/0079528 A1* | 3/2012 | Trimper | ........... | H04N 21/25891 725/31 |
| 2014/0298385 A1* | 10/2014 | Roberts | ............... | H04N 21/4332 725/45 |

* cited by examiner

*Primary Examiner* — Michael R Telan

(57) ABSTRACT

A content ingestion system and method allows a single pitch of media content and associated metadata to be provided by a content provider and processed into appropriate packages for different content distribution services or delivery platforms.

16 Claims, 5 Drawing Sheets

MEDIA CONTENT INGESTION

CROSS REFERENCE TO RELATED APPLICATIONS

The current application is a Continuation of U.S. patent application Ser. No. 14/753,545, filed Jun. 29, 2015, which is incorporated by reference herein in its entirety.

TECHNICAL FIELD

The current disclosure relates to ingesting media content into a content distribution system, and in particular to ingesting media content for distribution to multiple content distribution services or delivery platforms.

BACKGROUND

Media content, such as television shows, movies and sporting events can be viewed on a number of different devices. Such content consumption devices may include, for example, television sets, smart phones, tablets as well as browsers on personal computers. A user may subscribe to one or more service offerings that provide access to specific content across one or more of the content consumption devices. For example, a TV provider, such as a cable TV, IPTV or satellite TV provider can provide access to different TV channels or programming according to a particular subscription package. Depending upon the user's subscription, they may be authorized to view the content on one or more different types of the content consumption devices across one or more distribution or delivery platforms.

Different distribution services may require media content to be submitted to the distribution service along with metadata describing the content. Further, a content provider may specify different access rights for the same content across different distribution services or delivery platforms. The metadata may also include information on the access rights of the content in respect of the various distribution services.

It would be desirable to have an additional or alternative uniform specification and associated system for efficiently ingesting media assets for subsequent distribution by a plurality of different distribution services or delivery platforms.

BRIEF DESCRIPTION OF THE DRAWINGS

Embodiments are described herein with references to the appended drawings, in which.

DETAILED DESCRIPTION

Figure 1:
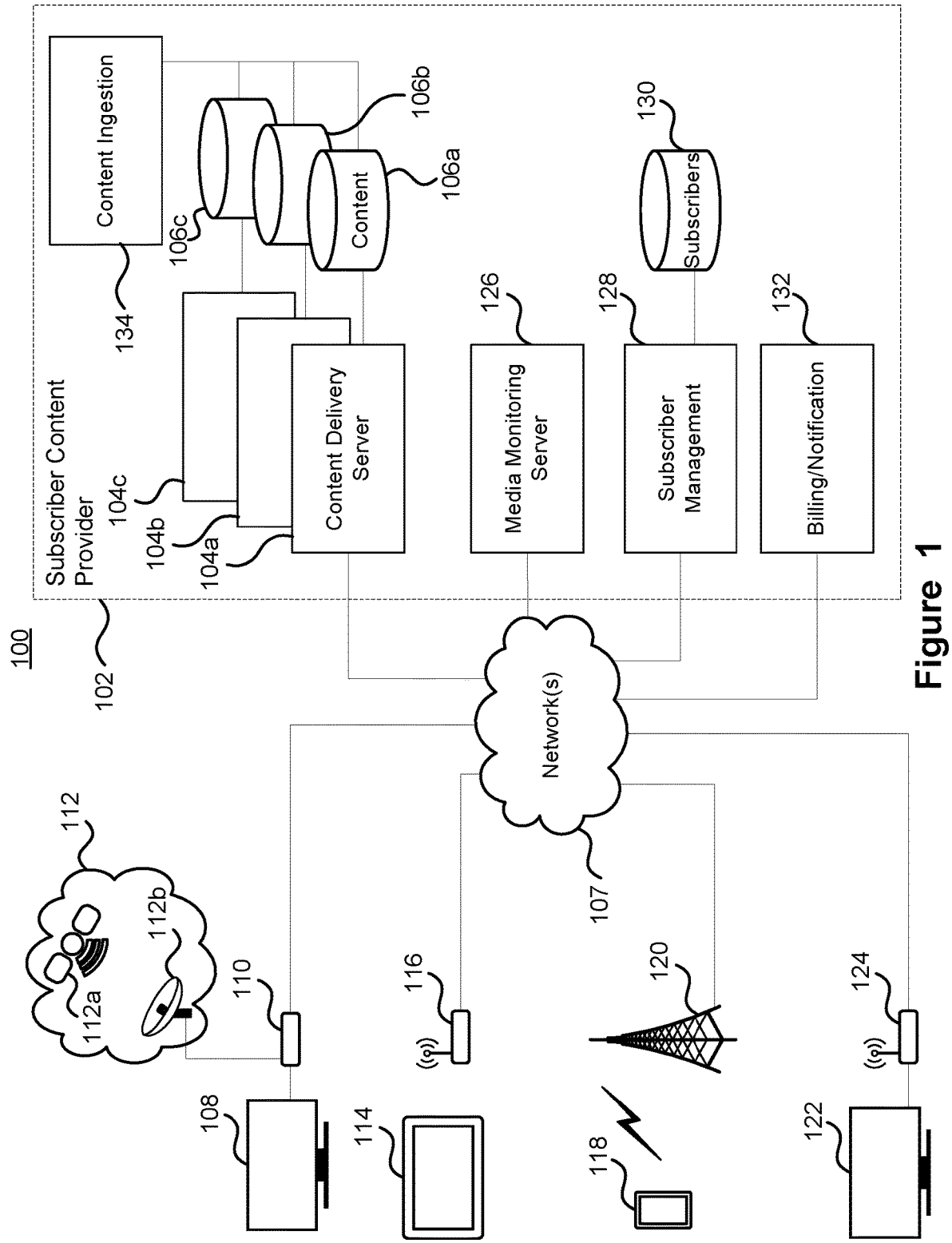
FIG. 1 depicts a content consumption system.

In accordance with the present disclosure there is provided a method for ingesting media content comprising: receiving a media asset and associated metadata describing the media content, the metadata including access rights information specifying access rights to the media asset over a plurality of different content distribution services, the metadata and access rights defined in accordance with a common metadata specification; generating from the received media asset, metadata and access rights a plurality of content distribution packages each conforming to a respective ingestion specification definition for a content delivery platform; providing each of the generated content distribution package to the respective content delivery platform for ingestion into the content delivery platform.

In accordance with the present disclosure there is further provided a device for ingesting media content comprising: a processing unit for executing instructions; and a memory unit for storing instructions, which when executed by the processing unit configure the device to: receive a media asset and associated metadata describing the media content, the metadata including access rights information specifying access rights to the media asset over a plurality of different content distribution services, the metadata and access rights defined in accordance with a common metadata specification; generate from the received media asset, metadata and access rights a plurality of content distribution packages each conforming to a respective ingestion specification definition for a content delivery platform; provide each of the generated content distribution package to the respective content delivery platform for ingestion into the content delivery platform.

Media content may be provided to a subscriber through various communication channels (i.e. over various delivery platforms). For example, a user may be able to receive media content, such as television shows, movies, sporting events, music etc. from a satellite TV provider, a cable TV provider, an IPTV (Internet Protocol Television) provider, an internet service provider (ISP) or a cellular network operator. Each content distributor or provider may have a respective distribution service or delivery platform for providing the media content to a subscriber. A single content provider may provide content to subscribers over one or more delivery platforms and/or channels. For example, a company may provide satellite TV or cable television service, cellular network service, and internet service. A single user may have a subscription for receiving content over each of the different distribution services or delivery platforms. However, each different content distribution service or delivery platform may provide its content from respective content stores, even if the content is the same. That is, multiple versions of the same content or media asset, such as a television show, may be stored in multiple different locations, and possibly under different names or identifiers, for distribution over the different distribution services or delivery platforms.

Depending upon the distribution service or delivery platform, and possibly the communication network type, different content may be available to a subscriber. For example, a user may be a subscriber to IPTV services as well as mobile TV services. The IPTV service may allow the subscriber to watch subscribed-to-TV channels using a STB while in their home environment. The mobile TV service may provide content, which may or may not overlap with the IPTV content, to the subscribers mobile device over a cellular network. A subscriber may be able to access content on multiple devices, from multiple service offerings across multiple distribution services or delivery platforms. As described further below, it is possible to monitor content consumption of a subscriber on a mobile device as well as other content consumption devices.

FIG. 1 depicts an example of a content consumption system 100. The system 100 depicts a subscriber content provider system 102 that can provide media content to subscribers. The content provider system 102 may include a plurality of different content distribution services or delivery platforms, depicted as content delivery servers 104a, 104b, 104c (referred to collectively as content delivery servers 104) and corresponding content data stores 106a, 106b, 106c. As an example, content delivery server 104a and content store 106a may comprise a portion of the system that provides streaming IPTV services to subscribers, content delivery server 104b and content store 106b may comprise a portion of the system that provides mobile TV services to subscribers and content delivery server 104c and content store 106c may comprise a portion of the system that provides satellite TV services to subscribers. Each of the content delivery servers 104a, 104b, 104c may distribute content across a respective network 107 which may include, for example, the internet, cellular networks, satellite communication networks, telephone networks, cable networks, or other networks. The media content may be distributed over respective networks 107 from the content delivery servers 104 to one or more content consumption devices of a user. The content consumption devices may include, for example a set top box (STB) 110 that receives the media content from a head-end system via a satellite network 112 comprising a satellite 112a and a receiving dish 112b attached to the STB 110. The STB 110 may be connected to a television 108. Additionally or alternatively, the functionality of the STB 110 may incorporated into the television itself. Media content may also be streamed to content consumption devices such as a tablet 114, smart phone, laptop, PC or other portable device over a public or private LAN (wired and/or wireless Wi-Fi network) provided by an access point 116. Media content may also be provided to a smart phone 118, tablet or similar portable device, over a cellular communication network 120. Media content may also be provided to a IPTV STB or IPTV-capable television 122 from an in-home network, provided by a wired and/or wireless Wi-Fi access point 124. Although various content consumption devices are described, it will be appreciated that these devices are only intended as examples and the media content may be provided to a content consumption device in other ways.

It will be appreciated that the subscriber content provider system 102 can provide media content over various different distribution systems or delivery platforms, which may be separate from each other. In order to provide an improved user experience in accessing content across multiple distribution systems, a media monitoring server 126 may be provided that monitors the media being consumed by a user. As described further herein, the media monitoring server 126 can monitor the content being consumed on a device and can control the delivery of content to the user.

The media monitoring server 126 may interact with a subscriber management system 128. The subscriber management system 128 may store subscriber information in a subscriber data store 130. The subscriber information may include, for example, a unique subscriber identifier, account information for each of the content delivery systems 104 the subscriber has an account for, billing information, etc.

The media monitoring server 126 may interact with a billing notification system 132 that uses the content consumption information in order to provide metering and billing based on the content consumed, as well as possibly the network connection type used by the subscriber in consuming the content.

As described above, media content can be provided to a subscriber over different communication channels and different distribution systems (or delivery platforms). The media content may be sourced from a content provider. The content provider can provide the media content or asset as well as metadata associated with the media content or asset. Each of the content delivery systems or platforms may have its own specific requirements with regard to the encoding of the media asset and the formatting of the metadata. As depicted in FIG. 1, the subscriber content provider system 102 may also include a content ingestion system 134 for receiving the media content and encoding the media asset for distribution across the various different distribution systems or delivery platforms. The content ingestion system 134 may also format or re-format the received metadata in accordance with formatting requirements of the different distribution systems or delivery platforms.

Figure 2:
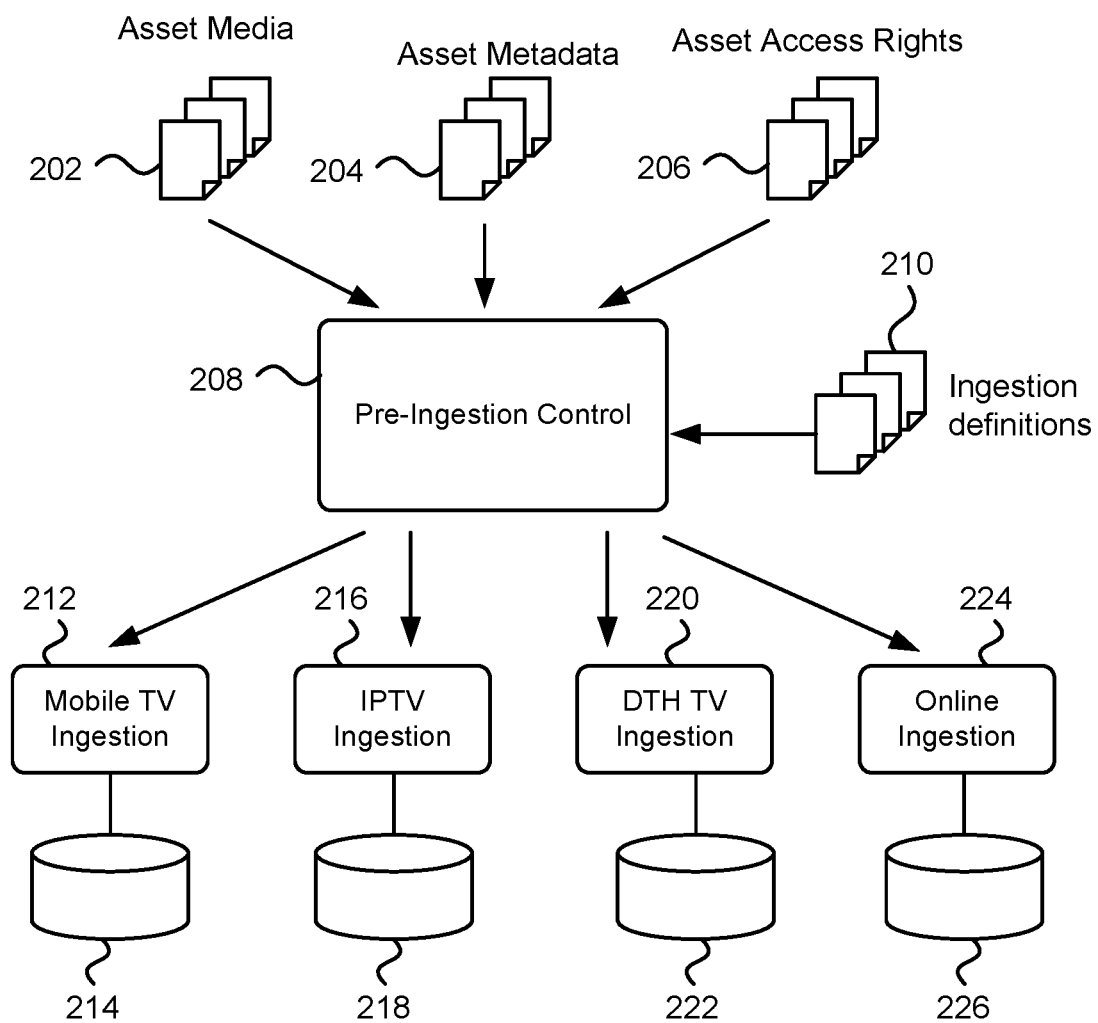
FIG. 2 depicts a system for ingesting media content for a plurality of distribution systems.

FIG. 2 depicts a system for ingesting media content for a plurality of distribution systems. Media assets, such as movies, TV shows, etc. may be imported or ingested into delivery platforms. Each delivery platform may have specific requirements for the media, its associated metadata and access rights. As depicted pre-ingestion control functionality 208 may be provided for receiving media assets 202, metadata 204 associated with the media as well as access rights 206 for the media across the different possible distribution platforms. The media asset may be received at the pre-ingestion control functionality over various communication methods, including wired and wireless networking technologies or via storage media such removable non-volatile storage. Similarly, the metadata and access rights may be received in various was including over network connections, storage media or the information may be manually input into the pre-ingestion control functionality 208. The pre-ingestion control functionality 208 receives the asset media, metadata and access rights and generates a plurality of asset packages that conform to the individual media ingestion definitions 210 of different content delivery platforms. Once an asset is packaged according to the ingestion definitions 210 it may be submitted to the associated delivery platform ingestion system.

As depicted in FIG. 2, a number of different ingestion functionalities for delivery platforms may receive respective packages prepared by the pre-ingestion control functionality 208. For example, mobile TV ingestion functionality 212 may receive a media package prepared for the mobile TV distribution platform. The mobile TV ingestion functionality 212 ingests the media content into a data store 214 for the distribution platform. Similarly, IPTV ingestion functionality 216 ingests an IPTV media package prepared by the pre-ingestion control into a respective data store 218. The DTH TV ingestion functionality 220 ingests a DTH TV package prepared by the pre-ingestion control into a respective data store 222 and online ingestion functionality 224 ingests an online package prepared by the pre-ingestion control 208 into a respective data store 226.

Once ingested into the respective delivery systems, the media content may be distributed to viewers in accordance with the respective delivery platforms. As described above, a content owner, or provider may provide a single copy of media and associated metadata and rights information which can be transformed into respective packages for subsequent ingestion into the respective delivery platforms. The content may be submitted to the pre-ingestion control functionality 208 in accordance with a common ingestion definition. The individual ingestion definitions 210 used by the pre-ingestion control 208 may include descriptions for transforming media assets defined in accordance with the common ingestion definition to the required ingestion definitions of the individual ingestion functionalities. For example, the ingestion definitions 210 may be described in extensible stylesheet language transformations (XSLT) that describe the steps for transforming media descriptions conforming to the common ingestion definition to the individual definitions of delivery platforms.

Although not explicitly depicted in FIG. 2, it will be appreciated that the various functionality described above, such as the pre-ingestion control functionality 208, the delivery platforms' ingestion functionality 212, 216, 220, 224 and associated data stores 214, 218, 222, 226 may be provided by one or more physical and or virtual servers comprising processors executing instructions stored in memory.

Figure 3:
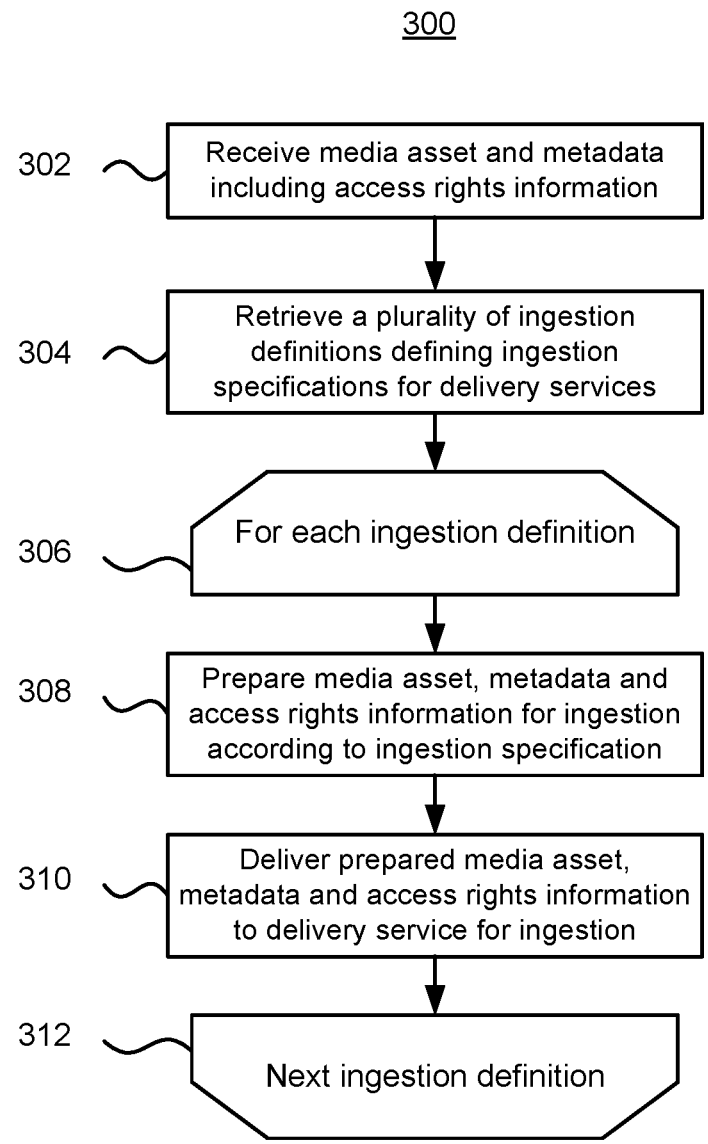
FIG. 3 depicts a method of ingestion media content for a plurality of distribution systems.

FIG. 3 depicts a method of ingestion media content for a plurality of distribution systems. The method 300 receives a media asset along with metadata and access rights information (302). The media asset may be received as, for example an audio/video file. The metadata may described various information associated with the media asset such as a name of the content, description, actors, length of the content, trailers, posters etc. The access rights may define access requirements for the different delivery platforms. As an example, a piece of content may be over an in-home Wi-Fi network but not over a public Wi-Fi network for a DTH TV delivery platform, while the same piece of content may be allowed to be streamed over a cellular network or public Wi-Fi network for a mobile TV delivery platform. The media asset, metadata and access rights may be provided in a format in accordance with a common definition.

Once the media asset, metadata and access rights information are received, a plurality of ingestion definitions may be retrieved (304). Each of the ingestion definitions may describe ingestion format requirements for individual delivery platforms or services. For each of the ingestion definitions (306), the method prepares a media package conforming to the ingestion definition (308). The media package may comprise the media asset, or a transcoded version or re-formatted version of the media asset, as well as associated metadata and access rights for the delivery platform. After generating the media package, it may be delivered to the delivery service for ingestion. The next ingestion definition (312) may be processed in the same manner to generate a media package for ingestion by the respective delivery service.

Figure 4:
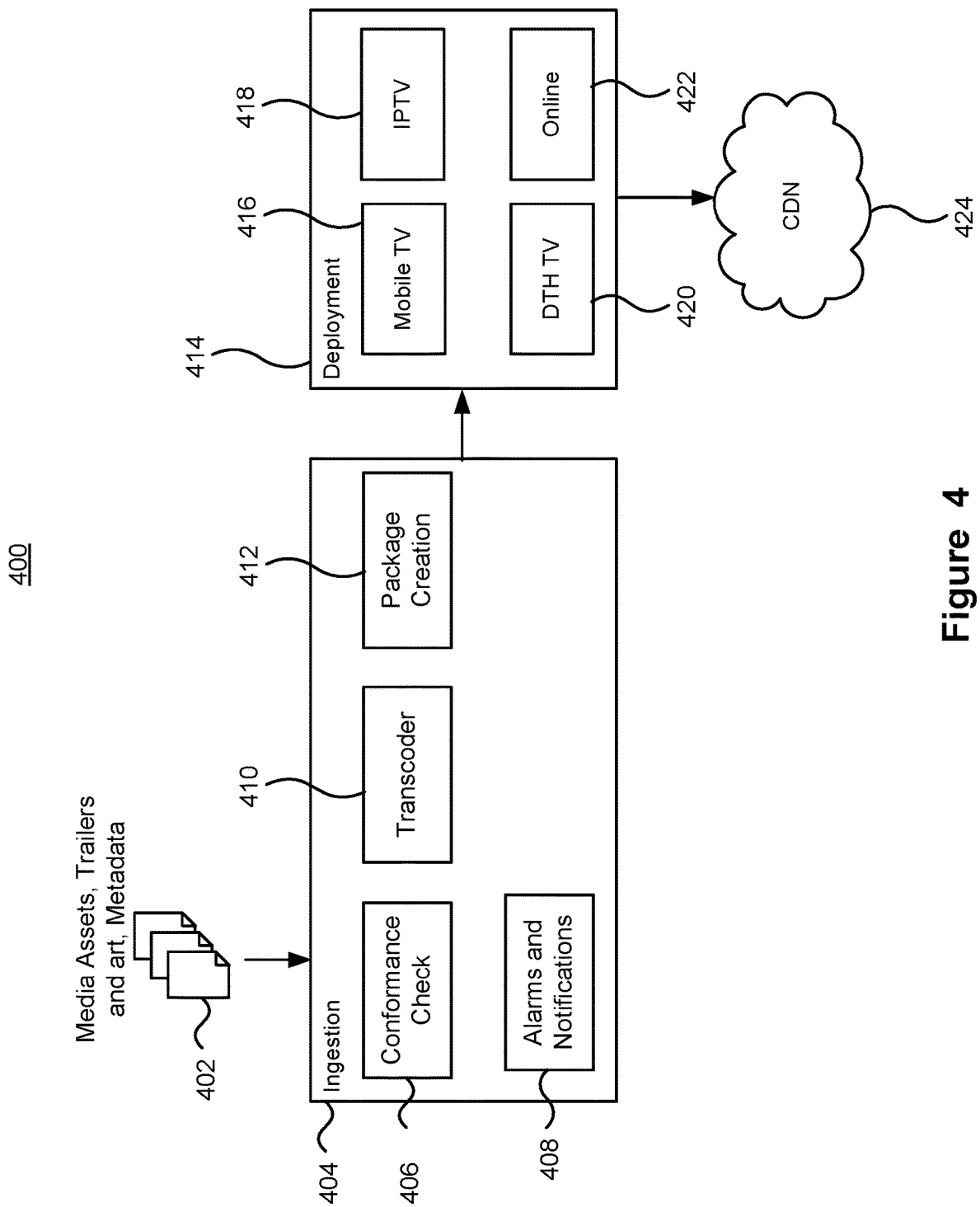
FIG. 4 depicts a content ingestion system.

FIG. 4 depicts an example of a content ingestion system 400. As depicted, the system 400 comprises various functionality for ingesting media content 402. The media content 402 includes media assets, trailers and artwork as well as metadata describing the media content. The metadata may include information on, for example, the name of the media asset, its description and length, and other identifying or informative information relevant to the media asset. According to one aspect of the invention, the metadata may further be tailored or enhanced to include content access rights information specifying all relevant access rights for the media asset resulting in an enhanced metadata specification which can be ingested and interpreted by each of the content delivery platforms. It will be appreciated that different content rights may exist for each content consumption device, network type (delivery platform) and customer type. Such rights are typically defined by contract terms with the source of the content or content provider. These terms are then typically translated to Digital Rights Management (DRM) rules. The content access rights information of the enhanced metadata specification may specify distribution systems the media content can be distributed by, as well as network information of network connection types the content can be distributed over as well as end-user devices that the media content is authorized to be viewed on.

The proposed enhanced metadata specification enables the management and tracking of multiple business rules (i.e. content access rights). As will be appreciated, common content access rights terms are shared on each contract with a content provider including, but not limited to, device hardware, operating system, network type, location and stream concurrency. These terms can be used to define a common set of definitions for implementing business rules. The business rules may be grouped into common platforms/user types to provide nested rules within the enhanced metadata specification thereby providing the appropriate context for each downstream video delivery platform (or user type). In this way, using a single pitch of the media asset and its associated enhanced metadata specification, downstream video platforms receive only the information they need to enforce the defined business rules thereby reducing complexity and the time required to ingest content. In addition, for end-users who subscribe to multiple video service offerings, storefronts may also be advantageously converged.

The system 400 of FIG. 4 includes an ingestion component 404 for ingesting the media content or asset and preparing it for deployment to different distribution systems or delivery platforms by a deployment component 414. The ingestion component 404 comprises conformance checking functionality 406 that processes the received content provider metadata to ensure it conforms or complies to the enhanced metadata specification. In a typical example, a media asset comprising video, metadata and artwork is pitched by a content provider to an asset management system (ASM) of the content distributor. It will be appreciated that the content provider and content distributor may be the same entity or distinct entities. The asset management system applies the defined business rules to generate an enhanced metadata specification for the particular media asset which is then delivered to a video content management system (Video CMS). The individual delivery platforms comprising the Video CMS can then format the metadata for each storefront and provide a data feed to the presentation layer. End users or subscribers may then access and consume video content via their devices.

The conformance checking functionality 406 may also check the media asset, artwork and trailers to ensure they conform to required formats. If the conformance checks determine errors, alarm and notification functionality 408 can provide notifications to responsible parties in order to address and/or correct the errors. Depending upon the severity of the error, the ingestion of the media content may be halted, or the content may be ingested but not deployed for distribution, or the content may be ingested and deployed, but the notification still sent.

The ingestion component 404 may further include a transcoder 410 for transcoding, or encoding, the media asset, and possibly trailers, into formats suitable for deployment by respective distribution services (i.e. delivery platforms). Once the media asset has been transcoded into the required formats, package creation functionality 412 creates media packages that can be distributed by the various distribution systems. One or more packages may need to be created if the different distribution systems have different requirements. Once the package or packages are created they can be deployed to the appropriate distribution system. For example, the packages may be deployed to a mobile TV service 416, an IPTV service 418, a DTH TV service 420 such as satellite or cable, or an online service 422. Depending upon the designs of the particular distribution services, one or more of the services may be able to distribute content from the same location. Regardless of how the content is ultimately distributed, the deployment functionality 414 provides the content packages to the systems as required for distribution. The distribution may be provided by one or more content distribution networks 424, or other networks or systems capable of distributing the content to users.

Figure 5:
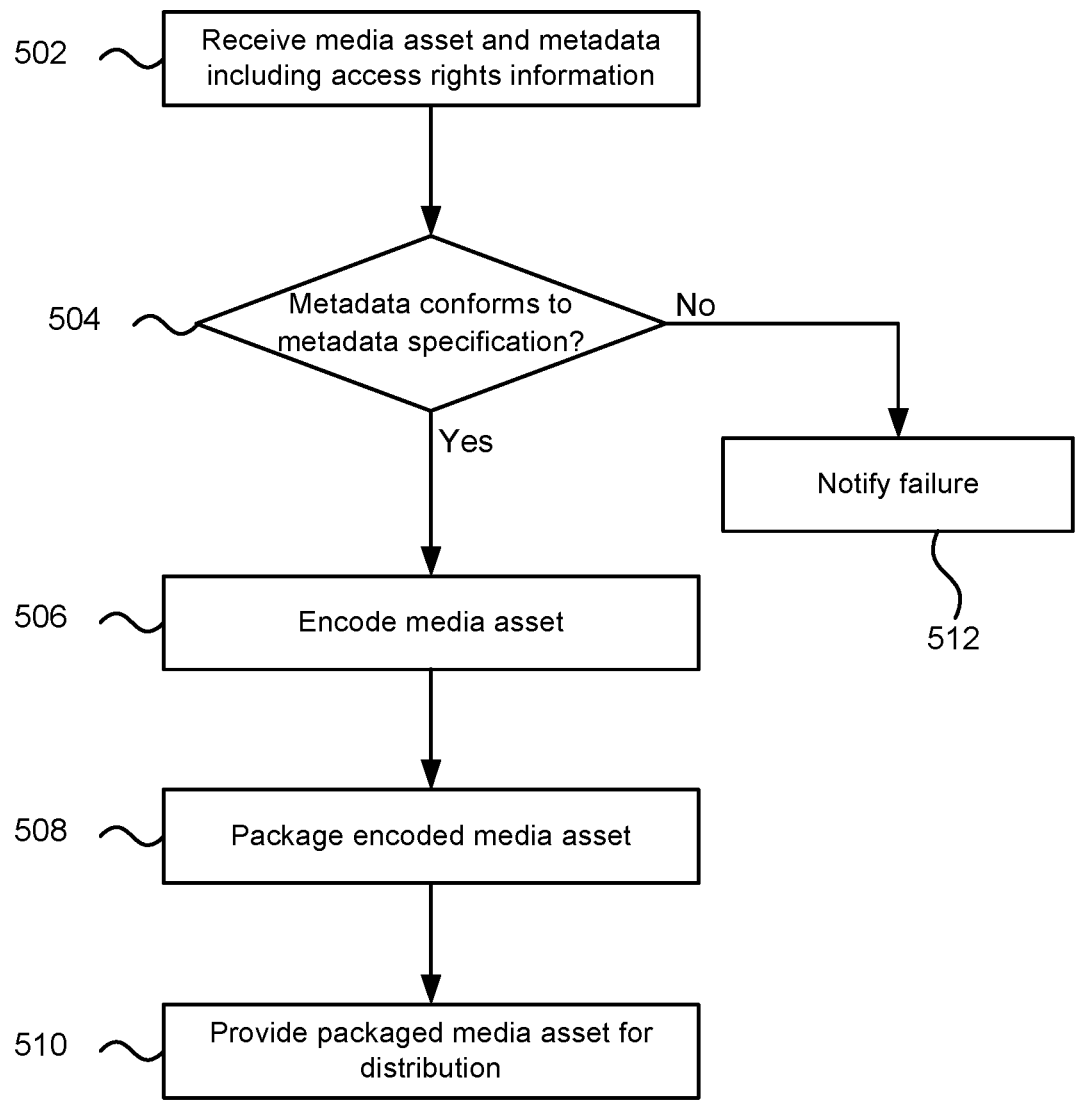
FIG. 5 depicts a method of ingesting media content for a plurality of distribution systems.

FIG. 5 depicts a method of ingesting media content for a plurality of distribution systems. The method 500 comprises receiving a media asset and metadata describing the media asset including access rights information (502). The metadata is checked to determine whether it conforms to a metadata specification (504). If it does conform to the metadata specification, the media asset is encoded for distribution (506) by distribution services specified in the metadata. Once encoded, one or more packages may be created (508) for deployment to the distribution systems. Each package may comprise only the required information in the metadata in order to simplify the subsequent ingestion of the package by the downstream video distribution systems. Once the packages are created they can be deployed to the particular content distribution systems (510), which may have respective ingestion functionality for adding content to the distribution systems. The above has described adding media content to a distribution system, however a similar process may be used in updating existing content. Similarly, the ingestion and deployment functionality may be used to delete corresponding content from multiple distribution systems at once.

The content rights for a particular media asset may differ for each device, network and customer type. These rights are typically defined in a contract, which are translated to Digital Rights Management Rules. A single media asset may have multiple different rules for the different distribution systems it can be distributed by. The metadata specification and processing described herein provides a common set of definitions for business rules that allows the rules to be expressed regardless of the different systems. For example, device hardware, operating system, network type, location, and stream concurrency are common terms shared between contracts. Further, the metadata specification described allows nested rules to provide context for the video platform, or user type. The business rules may be grouped into common platforms/user types. Although the initial metadata description of a media content may include all information required by all of the different video distribution platforms, the metadata is processed so that downstream video platforms receive only the information they need to enforce rules, which reduces complexity and time to ingest content. Further, by providing a common ingestion format for video, storefronts are converged for end-users who have multiple video services. That is, available content looks the same, is named the same and has the same art work regardless of the distribution platform used to view the content.

The following is an illustrative example of metadata and access rights described in accordance with a common ingestion definition for a movie.

What is claimed is:

1. A method for ingesting media content comprising:
receiving, at a pre-ingestion server, a single ingestion package for media content comprising:
an audio/video media asset; and
metadata specified using a common metadata specification providing a common set of content access right terms for specifying content access rights for a plurality of different content delivery platforms, the metadata describing different access rights of the media asset for each of the plurality of different content delivery platforms;
at the pre-ingestion server, generating from the received single ingestion package at least two different content distribution packages, each of the content distribution packages comprising content delivery platform metadata describing respective platform-specific access rights formatted according to a delivery platform ingestion specification definition for the respective content delivery platform, the delivery platform ingestion specification definition defining a format of the content delivery platform metadata for the respective content delivery platform, the respective platform-specific access rights prepared from the content access rights of the metadata specified using the common set of content access terms of the common metadata specification; and
providing each of the generated content distribution packages to the respective content delivery platforms for ingestion.

2. The method of claim 1, wherein the common metadata specification provides a single specification for describing media assets across all of the different content delivery platforms.

3. The method of claim 1, wherein the metadata of the ingestion package specifies one or more of the plurality of different content distribution services the media asset is distributed by.

4. The method of claim 1, further comprising:
checking the metadata of the ingestion package for conformance to the common metadata specification; and
generating an alert if the metadata of the ingestion package is determined to not conform to the common metadata specification.

5. The method of claim 1, wherein generating one or more of the content distribution packages further comprises:
encoding the media asset for distribution by the one or more content delivery platforms.

6. The method of claim 5, wherein encoding of the media asset is only done if the received metadata of the ingestion package conforms to the common metadata specification.

7. The method of claim 1, further comprising blocking providing the generated content distribution packages to the respective of content delivery platforms if the metadata does not conform to the common metadata specification.

8. The method of claim 1, wherein providing the respective content distribution package to the respective content delivery platform comprises storing the content distribution package in a content distribution network (CDN) for subsequent distribution to an end-user by an associated delivery platform.

9. A server device for ingesting media content comprising:
a processing unit for executing instructions; and
a memory unit for storing instructions, which when executed by the processing unit configure the device to:
receive, at a pre-ingestion server, a single ingestion package for media content comprising:
an audio/video media asset; and
metadata specified using a common metadata specification providing a common set of content access right terms for specifying content access rights for a plurality of different content delivery platforms, the metadata describing different access rights of the media asset for each of the plurality of different content delivery platforms;

generate from the received single ingestion package at least two different content distribution packages, each of the content distribution packages comprising content delivery platform metadata describing respective platform-specific access rights formatted according to a delivery platform ingestion specification definition for the respective content delivery platform, the delivery platform ingestion specification definition defining a format of the content delivery platform metadata for the respective content delivery platform, the respective platform-specific access rights prepared from the content access rights of the metadata specified using the common set of content access terms of the common metadata specification; and provide each of the generated content distribution packages to the respective content delivery platforms for ingestion.

10. The server device of claim 9, wherein the common metadata specification provides a single specification for describing media assets across all of the different content delivery platforms.

11. The server device of claim 9, wherein the metadata of the ingestion package specifies one or more of the plurality of different content distribution services the media asset is distributed by.

12. The server device of claim 9, wherein the executed instruction further configure the device to:

checking the metadata of the ingestion package for conformance to the common metadata specification; and generate an alert if the metadata of the ingestion package is determined to not conform to the common metadata specification.

13. The server device of claim 9, wherein generating one or more of the content distribution packages further comprises:

encoding the media asset for distribution by the one or more content delivery platforms.

14. The server device of claim 13, wherein encoding of the media asset is only done if the received metadata of the ingestion package conforms to the common metadata specification.

15. The server device of claim 9, wherein the executed instruction further configure the device to block providing the generated content distribution packages to the respective of content delivery platforms if the metadata does not conform to the common metadata specification.

16. The server device of claim 9, wherein providing the respective content distribution package to the respective content delivery platform comprises storing the content distribution package in a content distribution network (CDN) for subsequent distribution to an end-user by an associated delivery platform.

\* \* \* \* \*